United States Patent Office 3,349,430
Patented Oct. 31, 1967

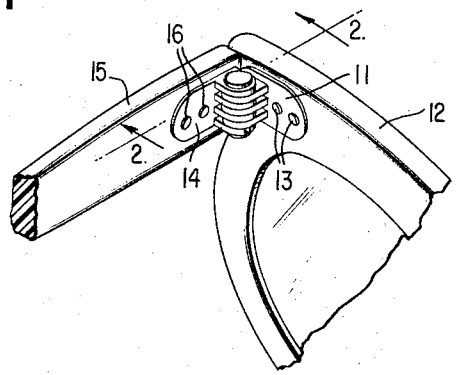
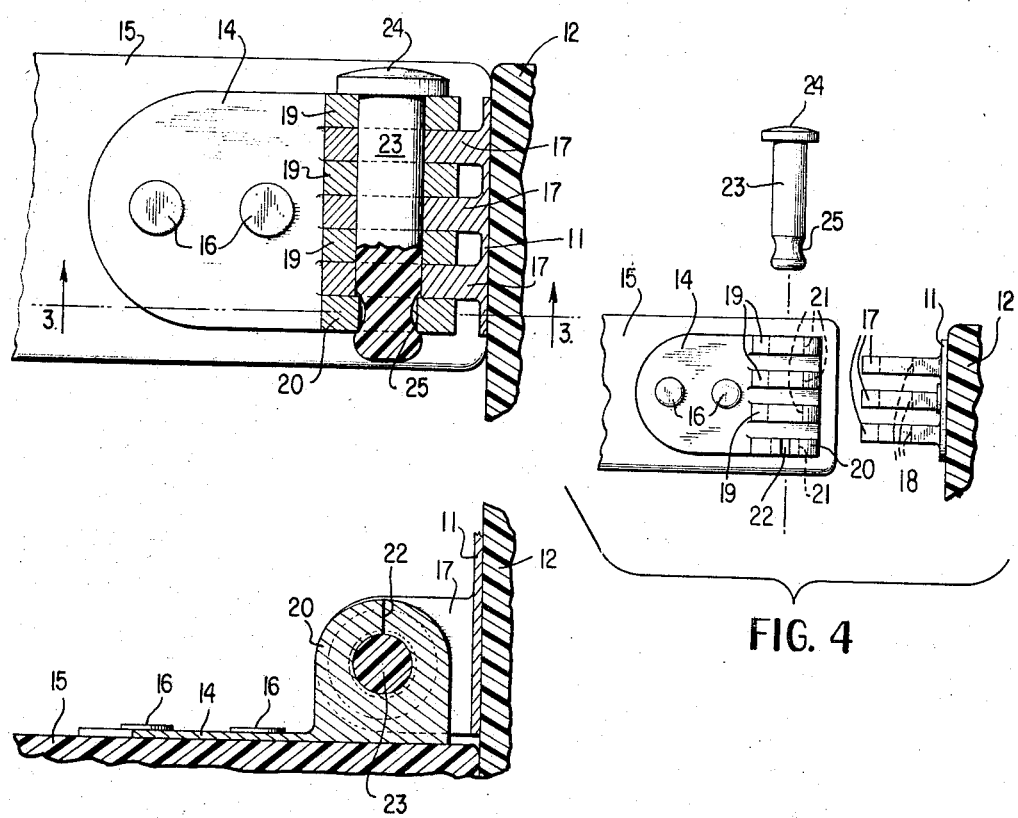

3,349,430
OPHTHALMIC MOUNTING HINGE
Lloyd K. Rosenvold and Robert J. Rosenvold, both of 1101 Main St., Montrose, Colo. 81401
Filed Nov. 23, 1964, Ser. No. 413,048
1 Claim. (Cl. 16—169)

ABSTRACT OF THE DISCLOSURE

An ophthalmic mounting hinge comprising interdigitated apertured lugs forming an aligned bore, one of said lugs being deformable to exert a clamping action on a hinge pin inserted in the bore.

---

This invention relates to hinges, and particularly to ophthalmic mounting hinges.

In the optical art, as well as in other arts, hinges have long been utilized in the assembly of movably connected parts. Spectacle frames and temples, for example, are customarily connected by a hinge having a screw threaded hinge pin and a correspondingly threaded hinge barrel. Such hinges are difficult to assemble and service if the assembly is broken or damaged because of their small size. Thus, the threaded hinge pin in such assemblies often becomes frozen or the screw head becomes damaged, and it is a laborious task to disassemble the unit to make the necessary repairs.

Additionally, the manufacture of such hinges is expensive, requiring precision tools and close manufacturing controls.

It is an object of this invention to provide hinge assemblies which are of simple, inexpensive construction requiring less close tolerances than prior art hinges.

A further object of this invention is to provide hinges which may easily and quickly be assembled and disassembled with a minimum of effort and with simple and inexpensive tools.

Other objects and advantages will be apparent to those skilled in the art from the description of the invention.

The hinge of this invention generally comprises a first leaf, a plurality of projecting lugs on the first leaf having aligned apertures therein, a second leaf, at least one projecting lug on the second leaf and having an aperture therein, the lugs on said respective leaves being interdigitated to provide an aligned bore through the respective lugs, one lug on the first leaf having means to enable deformation thereof for changing the character of the aperture therethrough to provide a clamping action, and a hinge pin in the aligned bore of said interdigitated lugs, the pin having an annular groove positioned adjacent the deformable lug on said first leaf. Preferred embodiments include such a hinge wherein the deformable lug is slit outwardly from the aperture to provide a bifurcated portion. In a further embodiment the pin is made of a plastic having self-lubricating properties, such as nylon.

In the drawing:

FIG. 1 is a perspective view of a spectacle frame and temple connection utilizing the hinge of this invention.

FIG. 2 is a cross section taken along lines 2—2 of FIG. 1.

FIG. 3 is a cross section taken along lines 3—3 of FIG. 2.

FIG. 4 is an elevation view of the hinge of the invention in its disassembled state.

Referring to the drawing, a hinge leaf 11 is secured to the spectacle frame 12, preferably as by rivets 13. A second hinge leaf 14 is secured to the temple bar 15 by rivets 16. Leaf 11 has a plurality of projecting lugs 17, each having an aperture 18 in axial alignment. Leaf 14 similarly has lugs 19 and 20 with similarly aligned apertures 21. The bottom lug 20 is slit at 22 providing a bifurcated portion so as to be deformable for a purpose to be more fully explained.

The respective lugs 17 and 19 and 20 are intermeshed or interdigitated to provide an aligned bore therethrough and a hinge pin 23 is positioned in the thus formed bore. The pin 23 has a head portion 24 and an annular groove 25 at a position corresponding to the deformable lug 20.

In asesmbling the hinge, the lugs 17 and 19 and 20 are interdigitated manually, the apertures are aligned as by inserting a punch or other tool therethrough, the aligning tool removed and the pin 23 inserted into the aligned bore. Thereafter the lug 20 is pinched to deform the same and clamp the lug about the groove 24 of the pin, thereby locking the pin in the bore. The lower end of the pin 23 may be flattened by riveting forceps to form a riveted end if desired, although this step is not normally necessary. Also, the lower end of the pin 23 may be cut off with a suitable cutting tool if necessary.

Disassembly of the hinge is accomplished by spreading the deformed lug 20 as by inserting a knife in the slit 22, punching out the pin 23 and separating the lugs.

The pin 23 is preferably made of a plastic material such as nylon, polytetrafluoroethylene, or the like which has lubricating properties although metal pins have been found to be satisfactory. Addtiionally, it has been found that conventional threaded hinge pins may be employed. In such cases, the lower lug 20 is pinched to clamp the same about the groove of the screw thread. Preferably the inner edge of the lower lug 20 is beveled or tapered to provide a section which is thin enough to fit into a groove of the threaded hinge pin. The leaf and lug portions are preferably of metal as in conventional although plastics are suitable.

The embodiment illustrated has four lugs on the temple leaf 14 and three lugs on the frame leaf 11, but it is apparent that any desired number of lugs may be employed. The deformable lug 20 may also be of different construction than that shown to enable changing the shape or size of the aperture to provide a clamping action on the pin 23. It is also apparent that the hinge of this invention will find utility in many other arts in addition to the field of ophthalmology.

While the invention has been described with reference to certain embodiments, they are to be considered illustrative rather than limiting, and it is intended to cover all further embodiments that fall within the spirit and scope of the appended claim.

We claim:

A hinge comprising a first leaf, a plurality of projecting lugs extending from top to bottom on said first leaf having vertically aligned apertures therein, a second leaf, a plurality of projecting lugs on said second leaf having aligned apertures therein, the lugs on said respective leaves being interdigitated providing an aligned bore through the respective lugs, the bottom lug on said first leaf being of a permanently deformable material, said bottom lug being slit outwardly from the aperture to form a bifurcated end thereon enabling permanent deformation of said bottom lug, and a hinge pin in the aligned bore of said interdigitated lugs, said pin having an annular groove positioned adjacent said bottom lug, said bottom lug being pinched into said annual groove of the pin to clamp and lock the pin in position.

References Cited

UNITED STATES PATENTS

| 1,278,928 | 9/1918 | Hillman | 85—8.6 |
| 2,828,668 | 4/1958 | De Angelis. | |
| 3,110,057 | 11/1963 | Urich | 16—142 |

MARVIN A. CHAMPION, *Primary Examiner.*

EDWARD C. ALLEN, *Examiner.*

J. H. McGLYNN, *Assistant Examiner.*